(12) United States Patent
Wenzel et al.

(10) Patent No.: US 7,670,845 B2
(45) Date of Patent: Mar. 2, 2010

(54) INDICATOR GRANULAR MATERIAL

(75) Inventors: Gunnar Wenzel, Verden (DE); Dietmar Lange, Vallendar (DE)

(73) Assignee: MARS Incorporated, McLean, VA (US)

( * ) Notice: Subject to any disclaimer, the term of this patent is extended or adjusted under 35 U.S.C. 154(b) by 171 days.

(21) Appl. No.: 11/575,448

(22) PCT Filed: Sep. 2, 2005

(86) PCT No.: PCT/EP2005/009453

§ 371 (c)(1),
(2), (4) Date: Oct. 23, 2007

(87) PCT Pub. No.: WO2006/032353

PCT Pub. Date: May 30, 2006

(65) Prior Publication Data

US 2009/0181466 A1 Jul. 16, 2009

(30) Foreign Application Priority Data

Sep. 23, 2004 (DE) ........................ 10 2004 046 102

(51) Int. Cl.
*G01N 31/22* (2006.01)
(52) U.S. Cl. ................ 436/163; 436/8; 436/164; 436/166; 422/55; 422/57
(58) Field of Classification Search ............... 436/8, 436/19, 163, 164, 165, 166; 422/55, 57; 252/408.1
See application file for complete search history.

(56) References Cited

U.S. PATENT DOCUMENTS

| | | | |
|---|---|---|---|
| 3,051,661 A * | 8/1962 | Collins | 436/163 |
| 4,520,172 A | 5/1985 | Lehmann et al. | |
| 5,143,023 A | 9/1992 | Kuhns | |
| 5,267,532 A * | 12/1993 | Franklin et al. | 119/173 |
| 5,371,054 A | 12/1994 | Pluta et al. | |
| 5,468,450 A * | 11/1995 | Michael | 422/56 |
| 5,534,269 A | 7/1996 | Igari et al. | |
| 5,554,147 A * | 9/1996 | Batich et al. | 604/890.1 |
| 5,996,534 A * | 12/1999 | Steckel et al. | 119/171 |
| 6,019,062 A | 2/2000 | Lombard et al. | |
| 6,162,646 A | 12/2000 | Webster et al. | |
| 6,309,666 B1 | 10/2001 | Hatano et al. | |
| 6,376,252 B1 | 4/2002 | Van Lente et al. | |
| 7,494,690 B2 | 2/2009 | Petereit et al. | |
| 2002/0133189 A1* | 9/2002 | Gifford et al. | 606/191 |
| 2005/0123596 A1* | 6/2005 | Kohane et al. | 424/450 |

FOREIGN PATENT DOCUMENTS

| | | |
|---|---|---|
| DE | 69420632 | 3/2000 |
| DE | 69624047 | 8/2003 |
| DE | 10260920 A1 | 7/2004 |
| EP | 0088951 A2 | 9/1983 |
| EP | 0569232 | 11/1993 |
| EP | 1029448 | 8/2000 |

\* cited by examiner

Primary Examiner—Maureen M Wallenhorst
(74) Attorney, Agent, or Firm—Fulbright & Jaworski, LLP

(57) ABSTRACT

The present invention relates to indicator granular material, especially for a cat lavatory, in which at least one first granular material is substantially completely coated with a first polymer layer, which is solid at a first pH and is dissolved at a second pH; and also to a cat lavatory and the use of the indicator granular material in a cat lavatory.

14 Claims, 1 Drawing Sheet

INDICATOR GRANULAR MATERIAL

CROSS-REFERENCE TO RELATED APPLICATIONS

This application is a national stage application of PCT/EP2005/009453 filed Sep. 2, 2005 claiming priority to DE 10 2004 046 102.3 filed Sep. 23, 2004

TECHNICAL FIELD

The present invention relates to indicator granular material, a cat lavatory comprising such indicator granular material, and the use of the indicator granular material in a cat lavatory.

BACKGROUND OF THE INVENTION

A wide variety of indicators for measuring the pH of a cat's urine are known from the state of the art. As a rule, such indicators take the form of granules or small scraps of various kinds, such as small strips of paper, which are impregnated with a wide variety of pH indicators. These indicators react to a change in pH by changing colour.

EP 0 569 232 A1, for example, discloses a pH indicator material in which a coating made from an aqueous solution of a water-soluble polymer is applied to an inert core substrate, which coating likewise contains a sufficient quantity of a water-soluble pH indicator dye. Depending on the change in the pH of the urine, the pH indicator dye can alter its colour and thus indicate the change in the pH of a cat's urine.

Other indicator dyes for determining the pH of a cat's urine are known, for example, from U.S. Pat. No. 6,162,646, U.S. Pat. No. 6,019,062, U.S. Pat. No. 5,143,023, U.S. Pat. No. 5,371,054 and U.S. Pat. No. 6,376,252.

A major disadvantage of the indicator materials known from the state of the art is that the change in the colour of the indicator depending on the pH takes place continuously over a particular colour spectrum. In the case of the indicator dye bromine xylenol blue, for example, colour changes from an acidic pH to a basic pH are known over the colour spectrum yellow/greenish-yellow/yellowish-green/green/bluish-green/greenish-blue/blue.

The result of such a change in colour is as a rule susceptible of subjective interpretation, which means that each user might assess the colour change subjectively differently, such as whether the colour is still yellowish-green or already greenish-yellow. This makes it difficult to determine a change in the pH of the urine precisely.

The object the present invention is to provide an indicator material which overcomes the disadvantages of the state of the art, i.e. in particular which makes it possible to determine unambiguously whether the pH of the urine has changed beyond a threshold level. In addition, it is intended that such an indicator material should be capable of being used in a simple manner in a conventional cat lavatory.

BRIEF SUMMARY OF THE INVENTION

The object is achieved in accordance with the invention by indicator granular material, especially for a cat lavatory, in which at least one first granular material is substantially completely coated with a first polymer layer, which is solid at a first pH and is dissolved at a second pH.

Most preferably, it is envisaged that a second granular material is substantially completely coated with a second polymer layer, which is solid at a first pH and is dissolved at a third pH.

It is preferably envisaged that the first pH is about 6.5-7.

In addition, indicator granular material is preferred in which the second pH lies in a range above 7, preferably above 7.5.

In one embodiment of the invention, it is provided that the third pH lies in a range below 6.5-7, preferably below 6.0, especially preferably below 5.5.

It is particularly preferably provided that indicator granular material is used in which the first and second granular materials are the same or different and are selected from plastics material, such as poly(meth)acrylate, low-density polyethylene, high-density polyethylene, polypropylene, biodegradable plastics material, glass and/or metal.

In a further embodiment, indicator granular material is preferably provided in which the first and second granular materials comprise biodegradable plastics material.

In addition, it is particularly preferably provided that the first and second granular materials should each be coloured differently.

It is preferably provided that the first and second polymer coatings should be built up on the basis of a (meth)acrylate polymer.

In accordance with the invention, it is proposed that the first polymer coating is a (meth)acrylate copolymer of 40-60% by weight methacrylic acid and 60-40% by weight ethyl acrylate.

It is likewise proposed that the second polymer coating is a copolymer of methyl methacrylate, butyl methacrylate and dimethyl amino-ethyl methacrylate, preferably in a ratio of 25:25:50.

In one embodiment of the invention, indicator granular material is provided in which the first and second polymer coatings are opaque.

The invention also encompasses a cat lavatory comprising indicator granular material in accordance with the invention.

It is particularly preferable to use an indicator granular material in accordance with the invention in a cat lavatory in order to determine the pH of a cat's urine.

The present invention offers a completely novel approach to determining the pH of a cat's urine in a cat lavatory. The indicator granular material of the invention yields an unambiguous yes/no criterion as to whether certain pH threshold values have been reached. A difficult interpretation of the colour change in conventional indicators is no longer necessary.

By coating a first pH-sensitive polymer on a first granular material, it is possible to ensure, in accordance with the invention, that the polymer layer does not dissolve as long as the pH of the cat urine remains within the desired ranges. Healthy cat urine is preferably slightly acidic to neutral. If the pH exceeds or falls short of this desired range, the polymer layer dissolves and releases the corresponding granular material. Such a change in the indicator granular material can advantageously be observed by a user especially if the granular material is suitably dyed relative to the granular material coated with the polymer layer and the polymer layer per se is opaque, so that, when there is a coating present, the colour of the granular material is not recognizable.

In accordance with the invention, a second granular material can preferably be used in addition, with a second polymer layer, said second granular material preferably being a different colour compared to the first granular material, and said second polymer layer dissolving at a third pH. If, for example, the first polymer layer dissolves at a basic pH and the second polymer layer at an acidic pH of less than 6.5, any change in the pH figure for a healthy cat can be indicated with the indicator granular material of the invention.

Polymers from the Eudragit® series ex Rohm GmbH und Co. KG, for example, can preferably be used for the first and second polymer layers. Eudragit® polymers have so far been used substantially for coating tablets. Correspondingly coated tablets either resist the acidic environment of the stomach and only dissolve in the alkaline environment of the intestinal tract, or, for some applications, dissolve in the acidic range, but are insoluble in the alkaline range.

Eudragit® LD30, for example, only dissolves above a pH of 7, whereas Eudragit® E PO only dissolves below a pH of 5.3. Eudragit® LD30 is a (meth)acrylate copolymer of 40-60% by weight methacrylic acid and 60-40% by weight ethyl acrylate, as is clear from DE 100 44 299 A1. From DE 102 60 920 A1 it can be seen that Eudragit® E PO is a copolymer of methyl methacrylate, butyl methacrylate and dimethyl aminomethyl methacrylate, preferably in a ratio of 25:25:50, where the average particle size of the copolymer is preferably 15 microns.

The polymer coatings can be applied to the granular materials in a simple manner as solutions or suspensions, whereupon the solvent or suspending agent is evaporated.

It is readily apparent to a man skilled in the art that the purposive choice of appropriate polymer layers makes it possible to optimize the precise adjustment of the solubility threshold of those polymers. In addition, the thickness of the individual polymer coating layers can be optimized in order to ensure that they are completely detached even with small volumes of urine. Finally, it is likewise obvious to a skilled person that the influence of the urine temperature on the solubility of the coating has to be taken into account. It can be learnt from EP 0 088 951, for example, that the solubility pH for the alkaline range is adjusted by varying the content of carboxyl groups, whereas the solubility pH for the acidic range can be adjusted by varying the content of amino groups.

BRIEF DESCRIPTION OF THE DRAWINGS

Further features and advantages of the present invention will become apparent from the following detailed description of a preferred embodiment with reference to a drawing consisting of a single figure.

DETAILED DESCRIPTION OF THE INVENTION

Figure 1:
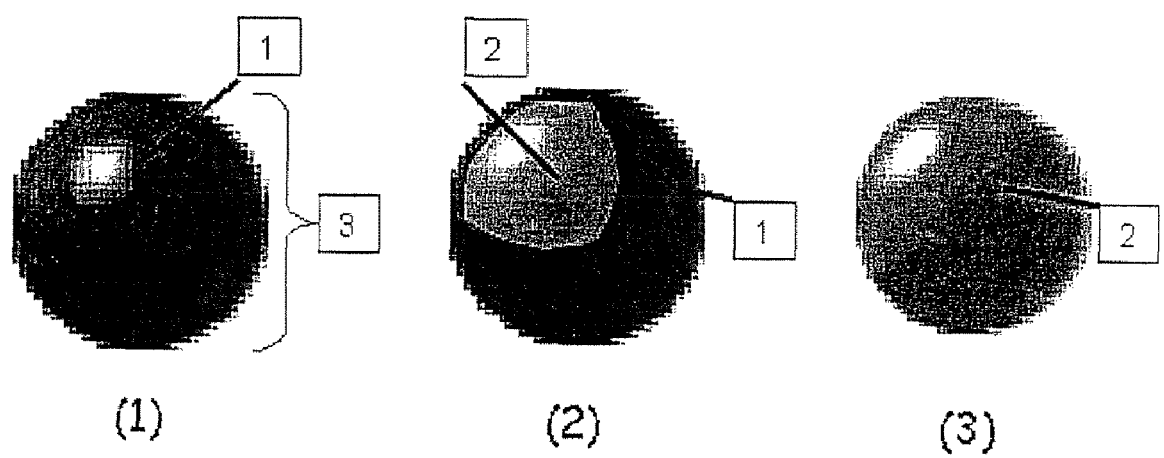
FIG. 1 schematically shows the dissolution of a polymer layer of an indicator granular material in accordance with the invention as a function of the pH.

Polymethyl methacrylate granulate (PMMA, Plexiglas®) dyed red was coated with Eudragit® LD30, which is only soluble above a pH of 7. That granular material was scattered on cat litter in a conventional cat lavatory. When a cat lavatory thus equipped is in use, as long as the urine excreted by a cat has a pH below 7, the polymer coating on the granular material remains intact. However, as soon as the pH of the urine reaches a level above pH 7, the polymer coating is detached and the red-coloured granular material becomes visible. As soon as the red-coloured granular material is visible, the indicator granular material of the present invention thus provides a clear yes/no criterion, indicating whether a certain threshold value of the pH has been exceeded.

Section (1) of the figure shows plastics granular material 2 coated with an intact polymer coating 1 in order to form indicator granular material 3. Section (2) of the figure shows a condition of the indicator granular material 3 when the pH is in a critical range: the polymer coating around the plastics granular material 2 is becoming detached. Finally, section (3) shows the indicator granular material 3 from which the polymer coating 1 has become completely detached. If the plastics granular material 2 is dyed, the colour indicates unambiguously that the pH of the cat urine is not within the desired range.

In accordance with the invention, it can further be provided, in a particularly preferred embodiment, that a second, e.g. yellow-coloured, plastics granular material is used which is coated with Eudragit® E PO for example, which is only soluble below a pH of 5.3.

If a mixture of the two variants of the above-described indicator granular material is applied to cat litter in a cat lavatory, the yellow granular material indicates an excessively acidic pH of the cat urine, while the red granular material indicates an excessively basic pH.

It goes without saying that it is preferable in this context for the first and second polymer layers to be of an inherently opaque colour in order to conceal the colour of the dyed granular materials.

Unlike the indicator materials known from the state of the art for determining the pH of cat urine, the indicator granular material of the invention makes it possible unambiguously and objectively to indicate a pH change beyond a threshold value.

It goes without saying that the indicator granular material of the invention can be used not only for cats, but also for dogs and other small animals.

It is likewise possible for the two granular materials to differ, after dissolution of the polymer coating, not with regard to their colour, but (or also) with regard to their material.

The features of the invention disclosed in the above description, in the claims and in the drawing can be essential to implementing the invention in its various embodiments both individually and in any combination.

What is claimed is:

1. A method of using an indicator granular material in a cat lavatory comprising the steps:

placing at least one first granular material into a cat lavatory, the first granular material being substantially completely coated with a first opaque polymer layer that conceals the color and/or the material of the first granular material, wherein the first opaque polymer layer is solid at a first pH and is dissolved at a second pH, thereby disclosing the color and/or the material of the first granular material;

placing a second granular material into a cat lavatory, the second granular material being substantially completely coated with a second opaque polymer layer that conceals the color and/or material of the second granular material, wherein the second opaque polymer layer is solid at a first pH and is dissolved at a third pH, thereby disclosing the color and/or the material of the second granular material; and placing a sample of a cat's urine into a cat lavatory, wherein the first and second granular material in the cat lavatory is used to determine the pH of the cat's urine by detecting whether or not the urine causes either the first or second opaque polymer layers to dissolve.

2. The method as claimed in claim 1, wherein the first pH is about 6.5-7.

3. The method as claimed in claim 1, wherein the second pH lies in a range above 7.

4. The method as claimed in claim 3, wherein the second pH lies above 7.5.

5. The method as claimed in claim 1, wherein the third pH lies in a range below 6.5-7.

6. The method as claimed claim 5, wherein the third pH lies in a range below 6.0.

7. The method as claimed claim 6, wherein the third pH lies in a range below 5.5.

8. The method as claimed in claim 1, wherein the first and second granular materials are the same or different and are selected from a material selected from the group consisting of poly(meth)acrylate, low-density polyethylene, high-density polyethylene, polypropylene, biodegradable plastics material, glass and/or metal.

9. The method as claimed in claim 8, wherein the first and second granular materials comprise biodegradable plastics material.

10. The method as claimed in claim 1, wherein the color of the first and second granular materials is different prior to each being coated with the polymer layer.

11. The method as claimed in claim 1, wherein the first and second polymer coatings are built up on the basis of a (meth)acrylate polymer.

12. The method as claimed in claim 11, wherein the first polymer coating is a (meth)acrylate copolymer of 40-60% by weight methacrylic acid and 60-40% by weight ethyl acrylate.

13. The method as claimed in claim 11, wherein the second polymer coating is a copolymer of methyl methacrylate, butyl methacrylate and dimethyl amino-ethyl methacrylate.

14. The method as claimed in claim 13, wherein the copolymer of methyl methacrylate, butyl methacrylate and dimethyl amino-ethyl methacrylate is in a ratio of 25:25:50.

* * * * *

UNITED STATES PATENT AND TRADEMARK OFFICE
CERTIFICATE OF CORRECTION

PATENT NO. : 7,670,845 B2  Page 1 of 1
APPLICATION NO. : 11/575448
DATED : March 2, 2010
INVENTOR(S) : Gunnar Wenzel et al.

It is certified that error appears in the above-identified patent and that said Letters Patent is hereby corrected as shown below:

Title page, ** Item (87) should read: PCT Pub. No.: WO2006/032353

PCT Pub. Date: ~~May~~ March 30, 2006 **

Signed and Sealed this

First Day of June, 2010

David J. Kappos
*Director of the United States Patent and Trademark Office*